United States Patent [19]

Watts

[11] 4,441,695

[45] Apr. 10, 1984

[54] PIPE CUTTING MACHINE

[76] Inventor: Donald R. Watts, 6004 4th Ct. NE., Tacoma, Wash. 98422

[21] Appl. No.: 12,153

[22] Filed: Feb. 14, 1979

[51] Int. Cl.³ .............................................. B23K 7/04
[52] U.S. Cl. ....................................................... 266/57
[58] Field of Search ........................................... 266/57

[56] References Cited

U.S. PATENT DOCUMENTS

2,778,625  1/1957  Evans ..................................... 266/57

*Primary Examiner*—M. J. Andrews
*Attorney, Agent, or Firm*—Kenneth S. Kessler

[57] ABSTRACT

A pipe cutting machine capable of cutting saddles and mitres and combinations of saddles and mitres is disclosed. The machine uses the rotation of the pipe itself to power a cam drive assembly. The cam drive assembly powers a saddle cam and a mitre cam. The saddle cam and the mitre cam may be set such that a specific mitre cut, saddle cut, or combination of saddle and mitre cut may be accomplished. A cable assembly translates the rotation of the saddle and mitre cams to a torch carriage. The torch carriage in turn translates its movement concurrently to the torch itself, thereby cutting the exact saddle, mitre, or combination of saddle and mitre cut desired.

10 Claims, 10 Drawing Figures fig.1 fig. 2 fig. 3 fig. 4A fig. 4B fig. 4C fig. 5 fig. 7 fig. 8 fig. 9 fig. 10

4,441,695

PIPE CUTTING MACHINE

DETAILED DESCRIPTION OF THE DRAWINGS

Figure 1:
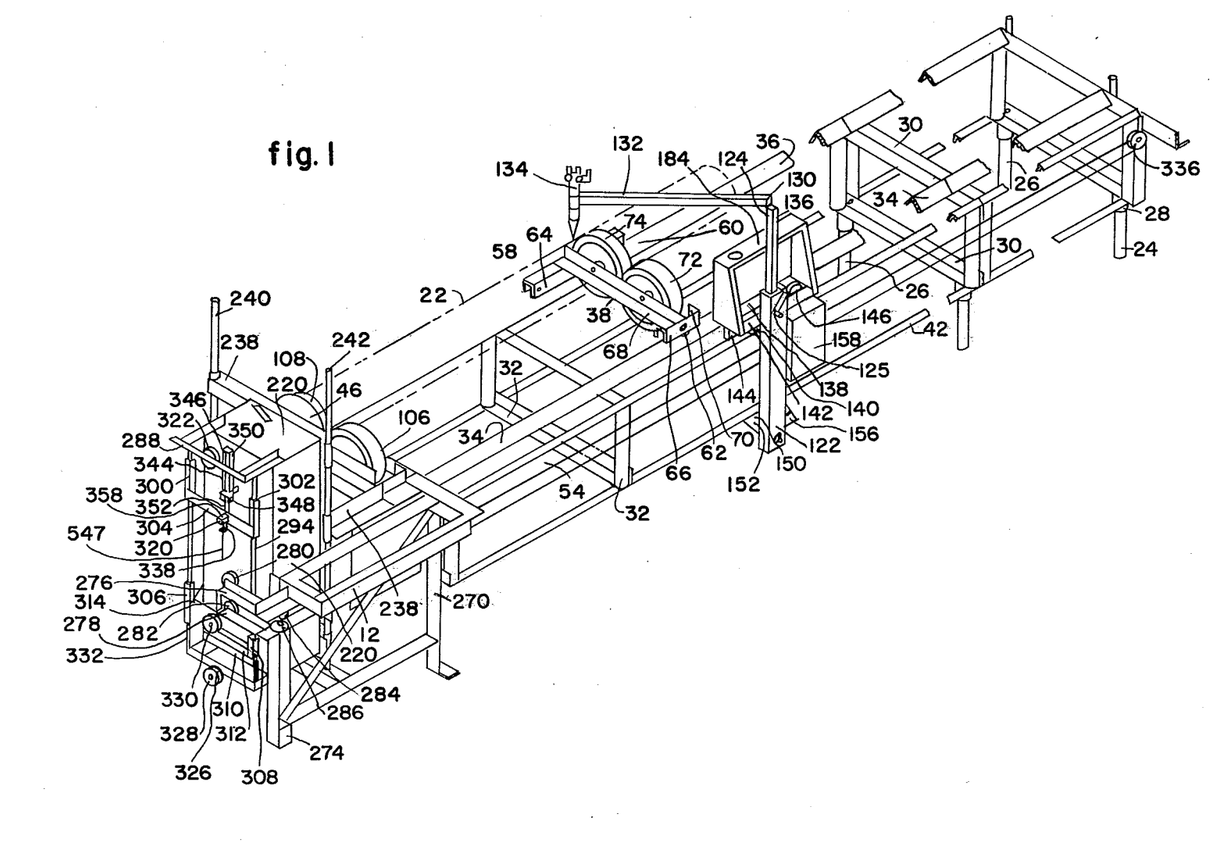
FIG. 1 is a perspective view of the pipe cutting machine with two pipe support rack modules secured thereto.

The pipe cutting machine 10 described herein is capable of cutting pipe by straight cuts, mitre cuts, saddle cuts and a combination of mitre and saddle cuts The support stand 12 supports the drive unit housing 14 cam drive assembly housing 15 and cable assembly 16. The drive unit support stand 12 can assume any conventional configuration the main conditions being that the support stand 12 be capable of holding the above units secure and at given angles.

Affixed to the support stand 12 is pipe support rack module 18. The support stand 12 is fastened to the pipe support rack module 18 by conventional means such as bolting. The pipe support rack module 18 may be made to any length. In the preferred embodiment, the length of the pipe support rack module is ten feet.

As set forth in FIG. 1, the pipe support rack module 20 is conventionally affixed to the pipe support rack module 18. Thus, the operator may extend the pipe cutting machine 10 to any length in order to support any given pipe 22 that is being cut. It has been found that up to four pipe support rack modules can be used effectively by an operator.

The pipe support rack modules 18 are lightweight and are designed such that two men can move and position them. Thus, two men can change the unit from a pipe cutting machine 10 with one pipe support rack module 18 to a pipe cutting machine 10 with four pipe support rack modules thus having the ability to effectively cut up to forty feet in length. The pipe support rack module 18 had adjustable support legs 24 and 26. The adjustable support legs 24 and 26 in the preferred embodiment may be screwed into a support leg coupling 28 thereby giving the support legs 24 and 26 the capability of adjusting to uneven surfaces All pipe support rack modules 18, 20 have but two adjustable support legs 24 and 26, for the pipe support rack modules 18, 20 are identical and only need two support legs 24 and 26. This is the case for the pipe support rack modules interface either the support stand 12 or the preceding pipe support rack module 18 or 20 by means of the interconnecting face 30 of the pipe support rack module 18,20 The interconnecting face of the pipe support rack module 30 is conventionally secured by bolts.

Affixed to the adjustable support legs 24 and 26 and coupling 28 is the pipe support rack module frame 32. The pipe support rack module frame 32 sets forth a base upon which the roller wheel tracks 34 and 36 may be affixed. In the preferred embodiment, the roller wheel tracks 34 and 36 are inverted angle irons but may take the configuration of any conventional track. The tracks 34 and 36 are laid out parallel to one another and allow for the roller wheel frames 38 to freely travel along the tracks 34 and 36.

The pipe support rack module frame 32 also serves as a base for the securing of the upper torch carriage track 40. The upper torch carriage track 40 is affixed at the upper side of the pipe support rack module frame 32. The upper torch carriage track is also parallel to the roller wheel tracks 34 and 36.

Affixed directly below the upper torch carriage track 40 is lower torch carriage track 42. In the preferred embodiment, both the upper torch carriage track and lower torch carriage track are inverted angle irons upon which wheels may easily run. The lower torch carriage track is inverted from the upper torch carriage track and, thus, allows for a tensioning grooved wheel to run along the bottom of the pipe support rack module frame 32.

As further illustrated in FIG. 1, the pipe drive assembly 44 is affixed to the drive unit support stand 12. The chuck 46 is in alignment with the pipe assembly 44. The pipe drive assembly rotates the pipe 22. The pipe 22 in turn rotates the chuck 46. The rotation of the chuck 46 powers the cam drive assembly 48. Positioned adjacent to the cam drive assembly 48 is the adjustable saddle cam 50 and the adjustable mitre cam 52. The adjustable saddle cam 50 and adjustable mitre cam 52 determine the movement of cable 54 which in turn determines the movement of the torch carriage 56. The above listed major components will be discussed in detail below.

The roller wheel frame 38 is capable of movement along the roller wheel tracks 34 and 36. The roller wheel frame 38 slides due to three traversible wheels 58, 60 and 62. Traversible wheels 58 and 60 are positioned within the traversible wheel housing 64. Traversible wheel 62 is positioned within the traversible wheel housing 66. The traversible wheels 58 60 and 62 are so positioned within the traversible wheel housings 64 and 66 such that the traversible wheels 58, 60 and 62 form a three point support. A three point support prevents rocking.

Affixed between the traversible wheel housings 64 and 66 are roller wheel axle frames 68 and 70. Positioned between the wheel axle frames 68 and 70 are roller wheels 72 and 74. The roller wheels 72 and 74 rotate about roller wheel axles 76 and 78.

The roller wheels 72 and 74 freely rotate and, thus, when the pipe 22 is rotating, the roller wheels 72 and 74 likewise rotate and thereby give support to the pipe 22 while not restricting the pipe's rotation. The outer circumference of the roller wheels 72 and 74 can be made of a variety of materials so long as the material does not allow a resting pipe to leave a lasting depression in the roller wheels circumference. Such a depression would hamper the desired rotation of the pipe 22.

In the preferred embodiment the roller wheels 72 and 74 are eight inches in diameter. Roller wheels of this diameter are capable of handling pipe from one and one-half inches to twenty-four inches in diameter. The roller wheels 72 and 74 could be a greater diameter and set further apart if a pipe greater than twenty-four inches is to be used.

A number of roller wheel frames 38 can be placed along the roller wheel tracks 34 and 36 thus holding a very long pipe 22. It should also be noted that the roller wheel tracks 34 and 36 of all the pipe support rack modules 18, 20 are in alignment and, thus the roller wheel frames 38 may slide uninterrupted from one pipe support rack module to another.

Figure 2:
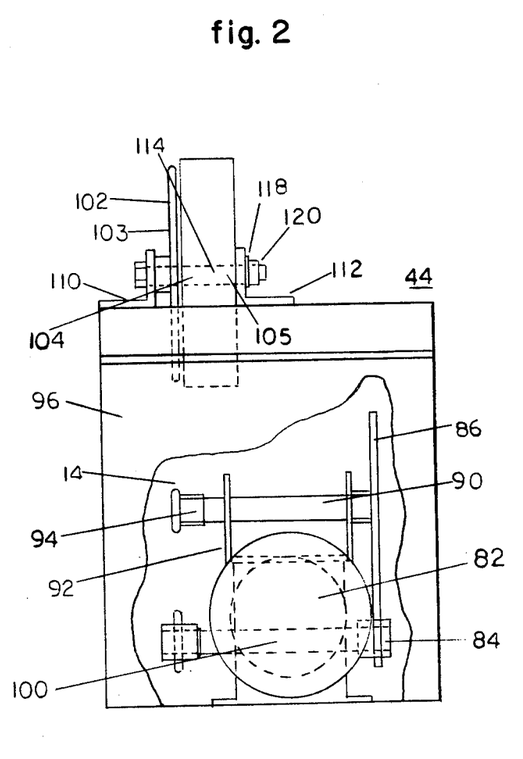
FIG. 2 is a side view of the drive mechanism with a partial cutaway view of the drive unit housing thereby allowing a direct view of the motor and drive sprockets.

A side view of the drive mechanism is illustrated in FIG. 2. As set forth in FIG. 1, the pipe 22 rests on the drive mechanism 14 which is affixed to the drive unit support stand 12. The drive mechanism 14 is housed within drive unit housing 80. The drive unit housing 80 is conventionally affixed to the drive unit support stand 12. Secured to the bottom of the drive unit housing 80 is motor 82. The motor 82 may be of any conventional type.

The motor 82 drives the motor drive sprocket 84. The motor drive sprocket in turn engages the large diameter drive sprocket 86. The motor drive sprocket 84 powers the large diameter drive sprocket 86 by drive chain 88. The large diameter drive sprocket is affixed to jack shaft 90. The jack shaft 90 is held in position by jack shaft housing 92 which is secured to the drive unit housing 80. The jack shaft 90 in turn powers small diameter drive sprocket 94. The small diameter drive sprocket 94 in turn powers drive chain 96. The drive chain 96 is intermeshed over small diameter drive sprocket 94 and idler sprocket 98; the idler sprocket 98 idles on motor shaft 100. Additionally, the drive chain 96 intermeshes with pipe drive wheel sprockets 102 and 103. Pipe drive wheel sprockets 102 and 103 are capable of rotating about drive wheel axles 104 and 105. Positioned about the drive wheel axles 104 and 105 are pipe drive wheels 106 and 108.

As set forth in FIG. 1, there are two pipe drive wheels, 106 and 108, upon which the pipe 22 rests. The pipe drive wheel 108 is powered identically to the powering of pipe drive wheel 106 and, thus, only the pipe drive wheel 106 will be set forth in detail.

Figure 3:
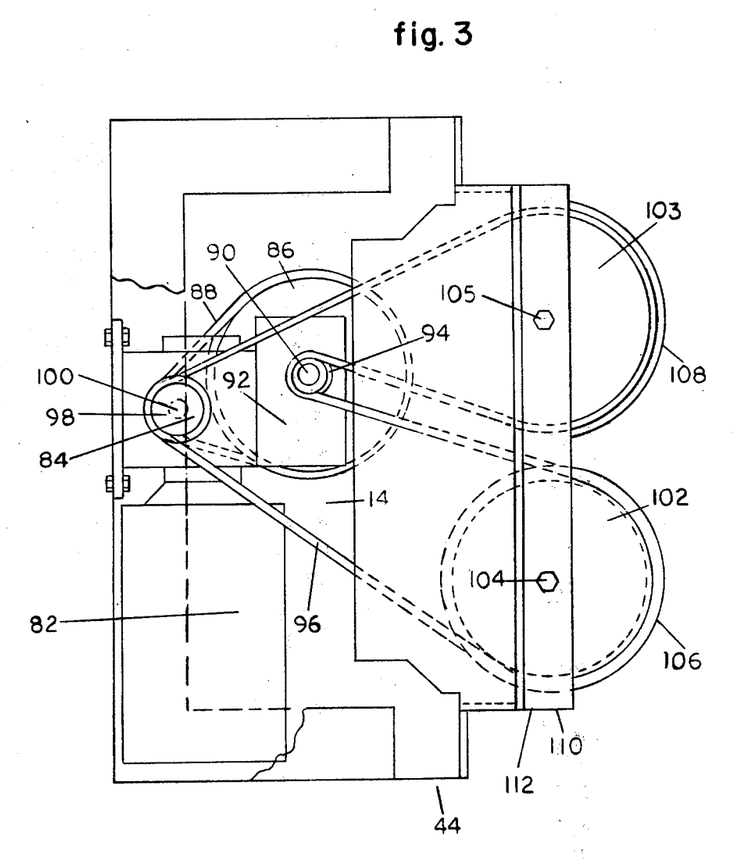
FIG. 3 is a front view of the drive mechanism illustrating how the drive chain powers the pipe drive wheels.

The pipe drive wheel sprocket 102 is secured to the pipe drive wheel 106 such that the rotation of the pipe drive wheel sprocket generates identical rotation by the pipe drive wheel 106. The drive wheel axle 104 is held in position by drive wheel axle frames 110 and 112. Positioned between drive wheel axle frame 110 and pipe drive wheel sprocket 102 is drive wheel spanner 114. In the preferred embodiment the drive wheel axle comprises a conventional bolt extending through the pipe drive wheel axle frames 110 and 112 whereupon it is secured to drive wheel axle frame 112 by means of a washer 118 and nut 120. Thus, the motor 82 is capable of driving the pipe drive wheels 106 and 108 which in turn rotate the pipe 22 at the desired rotation. The motor 82 is capable of adjustment as to revolutions per minute and, thus, the speed of rotation of the pipe is likewise controlled.

It is important to remember that as long as the operator has the same speed of rotation by the pipe drive wheels 106 and 108, the operator will have the same inches per minute of cut upon the pipe 22 irregardless of the diameter of pipe 22. Thus, if the operator has a four inch pipe he will have the same amount of cutting per inch of pipe as he would have on a fourteen inch diameter pipe. Thus, the pipe drive wheels 106 and 108 are effective in obtaining constant cutting. The speed of rotation may be necessarily changed, however, when the thickness of the pipe wall varies. Thus, as long as the thickness of the pipe wall is the same the operator may leave the rotation speed of the pipe drive wheels 106 and 108 the same irregardless of the diameter of the pipe.

Figure 4A:
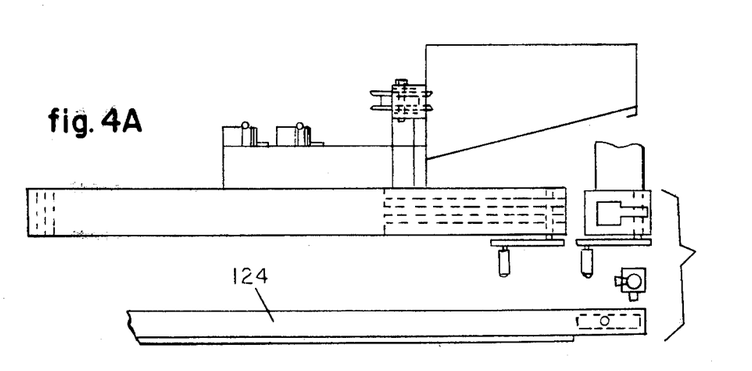
FIG. 4 is a front view of the torch carriage as it would be positioned on the upper and lower torch carriage tracks.
Figure 4B:
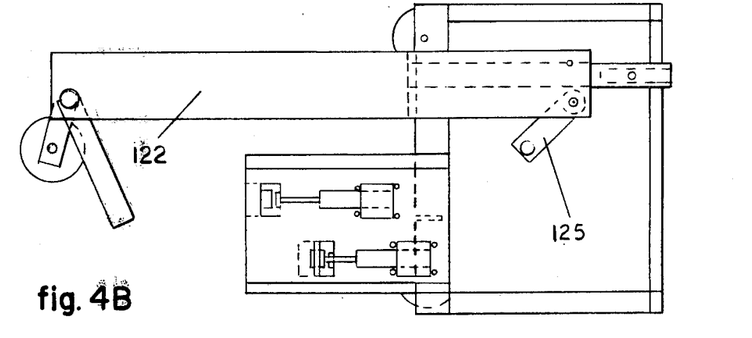
Figure 4C:
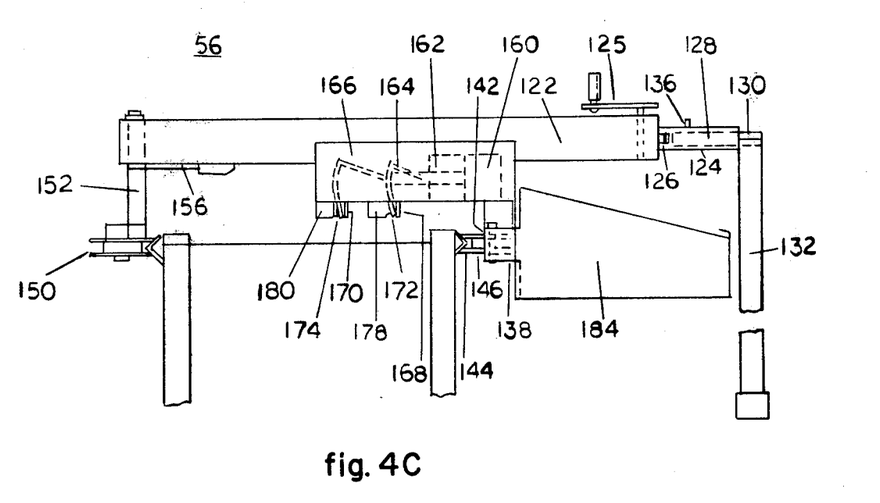

As set forth in FIG. 1, the torch carriage 56 is capable of movement along the upper torch carriage track 40 and lower torch carriage track 42 which are affixed to the pipe support rack module frame 32. A front view of the torch carriage 56 is illustrated in FIG. 4.

The vertical post housing 122 is capable of securing the adjustable vertical post 124. The vertical post housing 122 includes the vertical post adjustment 125 which is capable of raising and lowering the adjustable vertical post to the desired highth. In the preferred embodiment, the vertical post adjustment 125 raises and lowers the adjustable vertical post 124 by a series of teeth 126 along the adjustable vertical post 124. The adjustable vertical post 124 at its upper end, has a tubular insert 128 which allows for the insertion of the tubular extension 130 of the horizontal torch arm 132. The horizontal torch arm 132 extends over the pipe support rack module 18. The torch 134 is secured to the horizontal torch arm 132. The tubular insert 128 and the tubular extension 130 give the horizontal torch arm 132 the capability of swinging in a 360° angle in a horizontal plane above the vertical post housing 122. Thus, the operator may, by loosening set screw 136, swing the horizontal torch arm to the desired position for cutting pipe 22. Thus, the vertical post adjustment 124, and the tubular insert 128 give the torch 134 the capability of being placed in any desired position.

The vertical post housing 122 is secured to the control panel wheel frame 138 by support 140. The support 140 keeps the control panel wheel frame in a secured position parallel to the vertical post housing 122. Opposite the control panel wheel frame 138 is control panel wheel frame 142. The control panel wheel frames 138 and 142 house control panel wheels 144 and 146 which guide the control panel housing 146 which is affixed to the control panel wheel frames 138 and 142. The control panel wheels 144 and 146 guide the control panel housing along the upper torch carriage track 40.

At the bottom of the vertical post housing 122 is extended lower torch carriage track wheel 150. The lower torch carriage track 150 is positioned at the end of the pivot bar 152. The pivot bar 152 is housed within the vertical post housing 122. A conventional spring mechanism 156 keeps the lower torch carriage track wheel 150 secured against the lower torch carriage track 42. The spring mechanism creates a pinching action between control panel wheels 144 and 146 and lower torch carriage track wheel 150.

The torch carriage 56 is moved along the upper and lower torch carriage tracks 40 and 42 by cable 54.

The solenoid housing 158 houses the mechanism which transfers cable 54 to the torch carriage 56. The solenoid housing 158 is secured directly to the vertical post housing 122. Secured within the solenoid housing 158 are solenoids 160 and 162.

The purpose of the solenoids 160 and 162 is to grip the cable 54 such that any movement of the cable 54 will correspond in a like movement by the torch carriage 56 and, thus, also a like movement by the torch 134. Since the cable 54 is designed to move in a pattern that will cut saddles and mitres, and combinations of saddles and mitres, the corresponding movement of the torch will likewise cause the cutting of saddles and mitres and combinations of saddles and mitres.

The solenoids 160 and 162 when thrown into a closed position, cause the hinge mechanisms 164 and 166 to cause the rubber gripping platforms 168 and 170 to come down onto the lower gripping platforms 172 and 174 thus causing a pinching action on the cable 54. Both the upper gripping platforms 168 and 170 and the lower gripping platforms 172 and 174 have rubber gripping pads 176 which are capable, when the upper gripping platforms 168 and 170 and lower gripping platforms 172 and 174 are in the closed position, of holding the cable 54 tightly secure. The upper gripping platforms 168 and 170 and the lower gripping platforms 172 and 174 extend through cutouts 178 and 180 in the solenoid housing 158 thereby allowing the upper gripping platform and lower gripping platform to extend through the solenoid housing 158 and thus be capable of becoming secured to the cable 54. Thus, as the cable 54 moves, the solenoid housing 158 and the torch carriage 56 move concurrently. Solenoids give the operator the capability of placing the solenoids 160 and 162 in an open or closed through controls on the control panel face plate 182.

Figure 10:
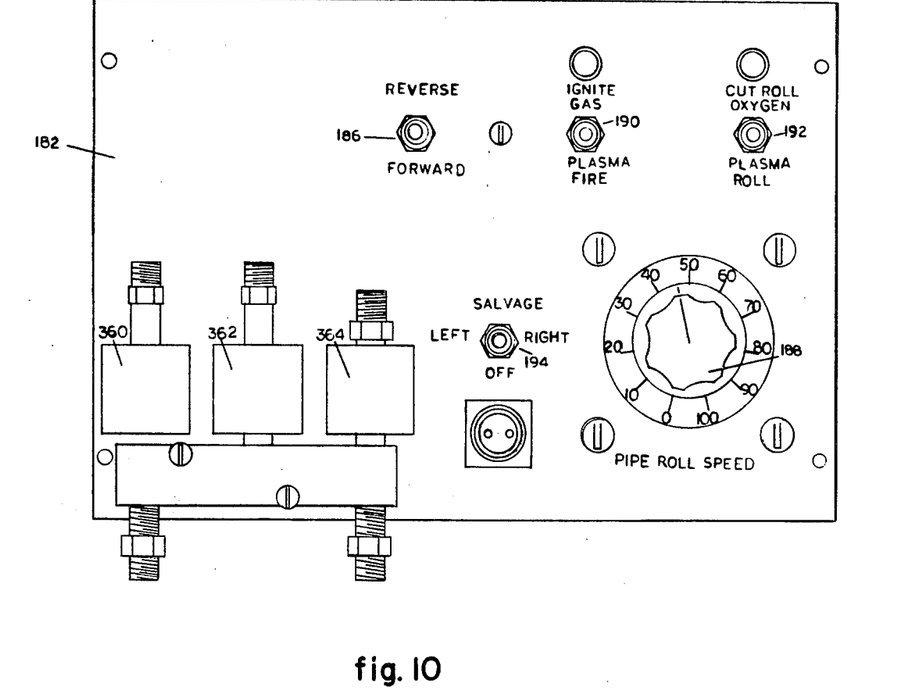
FIG. 10 is a plan view of the control panel face plate.

The control panel faceplate 182 is affixed to the control panel housing 184. On the control panel faceplate 182 are the following controls: the pipe drive range control 186; a fine tuned speed control 188; an ignite switch 190; operation switch 192; and a left and right salvage switch 194.

The pipe drive range control has three positions: the off position 196; the forward position 198; and the reverse position 200. In effect, the pipe drive range control 186 determines the direction of rotation.

The fine tuned speed control 188 is also positioned on the control panel faceplate 182. Thus, an operator can determine within the range the exact inches per minute of cut he desires by controlling the motor 82 through the fine tuned speed control.

The ignite switch 190 also has three positions: an off position 202; a gas position 204 which allows gas to the torch; and a plasma fire position 206; which creates a plasma fire cutting effect in a plasma mode.

The operation switch 192 also has three positions: an off position 208; a cut-roll oxygen position 210; and a plasma-roll position 212. When the operator places the operation switch 192 in the cut-roll oxygen position 210, the drive wheel assembly is engaged and simultaneously, the torch 134 is applied with a stream of oxygen. Thus, the pipe is simultaneously begun to rotate with the cutting stream of oxygen reaching the torch 134. Similarly when the ignite switch 190 is placed in the plasma fire position 206, the operator waits until he sees a penetration by the torch 134 of the pipe wall and upon seeing this, pushes the operation switch 192 into the plasma roll position 212, which in effect causes the rotation of the pipe 22. Thus, the pipe begins to rotate once the plasma fire condition has cut through the pipe.

Also, positioned on the pipe control face plate 182 is the salvage determination switch 194. The salvage determination switch 194 has three positions: the off position 214; the salvage right position 216; and the salvage left position 218. In the off position 214, the torch will cut a straight 90° cut. This is accomplished due to the fact that neither of the solenoids 160 and 162 will grip the cable 54 and, thus, the torch carriage assembly will stay stationary.

When the salvage left position is indicated, the solenoid 162 causes the gripping of the lower position of the cable 54, thus causing the torch carriage 56 to pick up the camming action of the lower cable position of cable 54.

When the salvage determination switch 194 is placed in the salvage right position 216, the solenoid 160 is activated and the upper cable position of cable 54 is gripped thereby causing the torch carriage assembly to run concurrently with the movement of the upper cable 54. Thus, the left and right positions 218 and 216 of the salvage determination switch 194 are completely 180° out of phase.

In order to more clearly understand the switches on the control panel faceplate 182, a typical complete operation will be described. First, the operator puts the pipe 22 on the pipe drive wheels 106 and 108. After that is accomplished, the operator sets the direction of rotation of the pipe by the pipe drive range control switch 186. After this is accomplished, the operator sets the fine tuned speed control 188. The operator's next determination is whether he is going to cut by plasma fire or whether he is going to cut by oxygen which is determined by the ignite switch 190. Determination of whether to cut by oxygen or by plasma fire, is first determined by the type of torch unit which is affixed to the torch carriage 56.

For our example, let us consider that a plasma-fire unit is in operation. The operator's next decision is to consider whether he wants a left or right salvage. He thus makes that determination and pushes the salvage determination switch in either the left or right position. Let us arbitrarily determine that he wants to make a right salvage 216 and he pushes the salvage determination switch into the right salvage position 216. The operator next turns the ignite switch 190 into the plasma-fire position 206. He then watches the plasma-fire until it has cut through the pipe wall 22, whereupon he turns the operation switch 192 into the plasma-roll position 212, whereupon the drive assembly causes the pipe 22 to rotate. Later on in the discussion the exact settings on the camming assembly will be described in detail thus explaining the positions in which a saddle, mitre or combination of saddle and mitre cuts may be accomplished.

Affixed to the drive unit housing 80 is the cam drive assembly housing 220. The cam drive assembly housing 220 is to the rear of the drive unit housing 80. Secured to the cam drive assembly housing 220 is the chuck face plate 222. The chuck face plate 222 is secured to the cam drive assembly housing 220 by means of chuck face plate shaft 224. Affixed to the chuck face plate 222 is chuck 46. The chuck 46 is in alignment with the pipe drive wheels 106 and 108 and, thus, pipe 22 is capable of being affixed to the chuck 46. The purpose of the chuck 46 is not to drive the pipe 22. In fact, the chuck 46 is free wheeling and is rotated by the rotating pipe 22. The purpose then of the chuck 46 is to drive the adjustable saddle cam 50 and the adjustable mitre cam 52.

Figure 5:
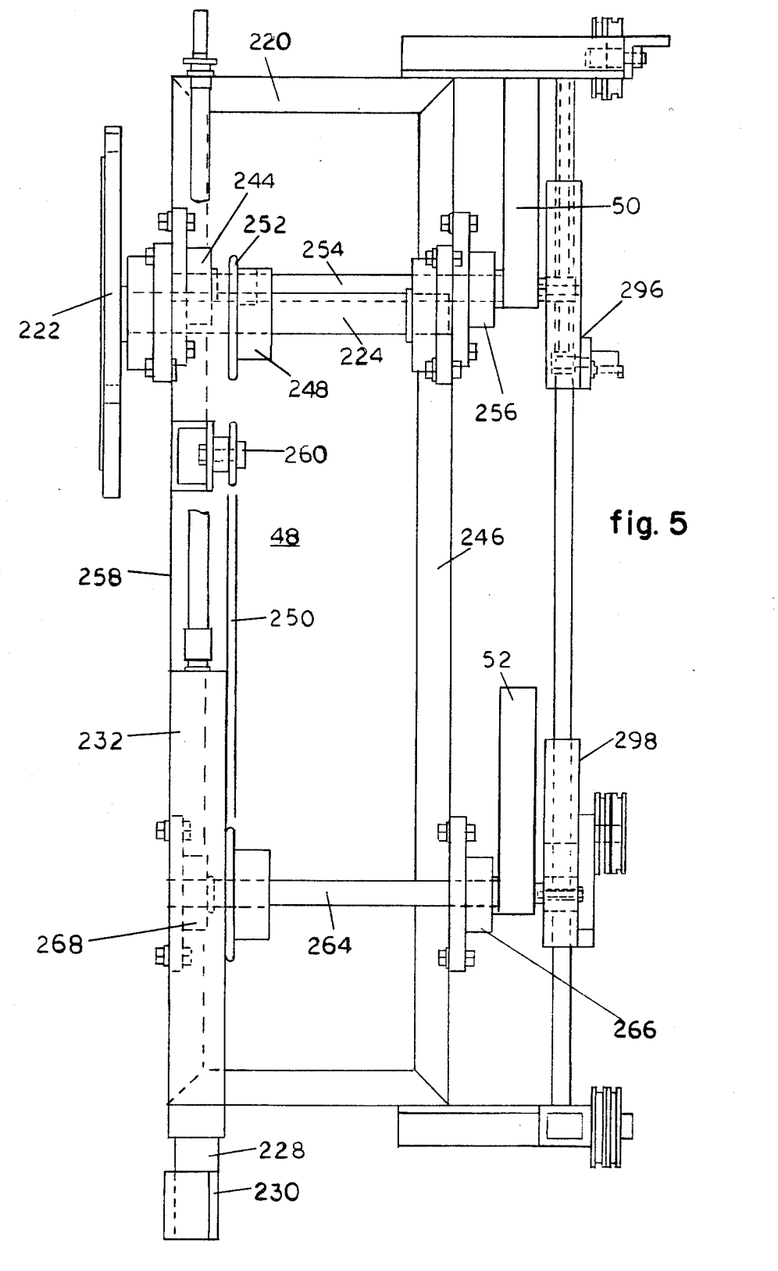
FIG. 5 is a sectional side view of the cam drive assembly and the adjacent adjustable saddle cam and adjustable mitre cam.
Figure 6:
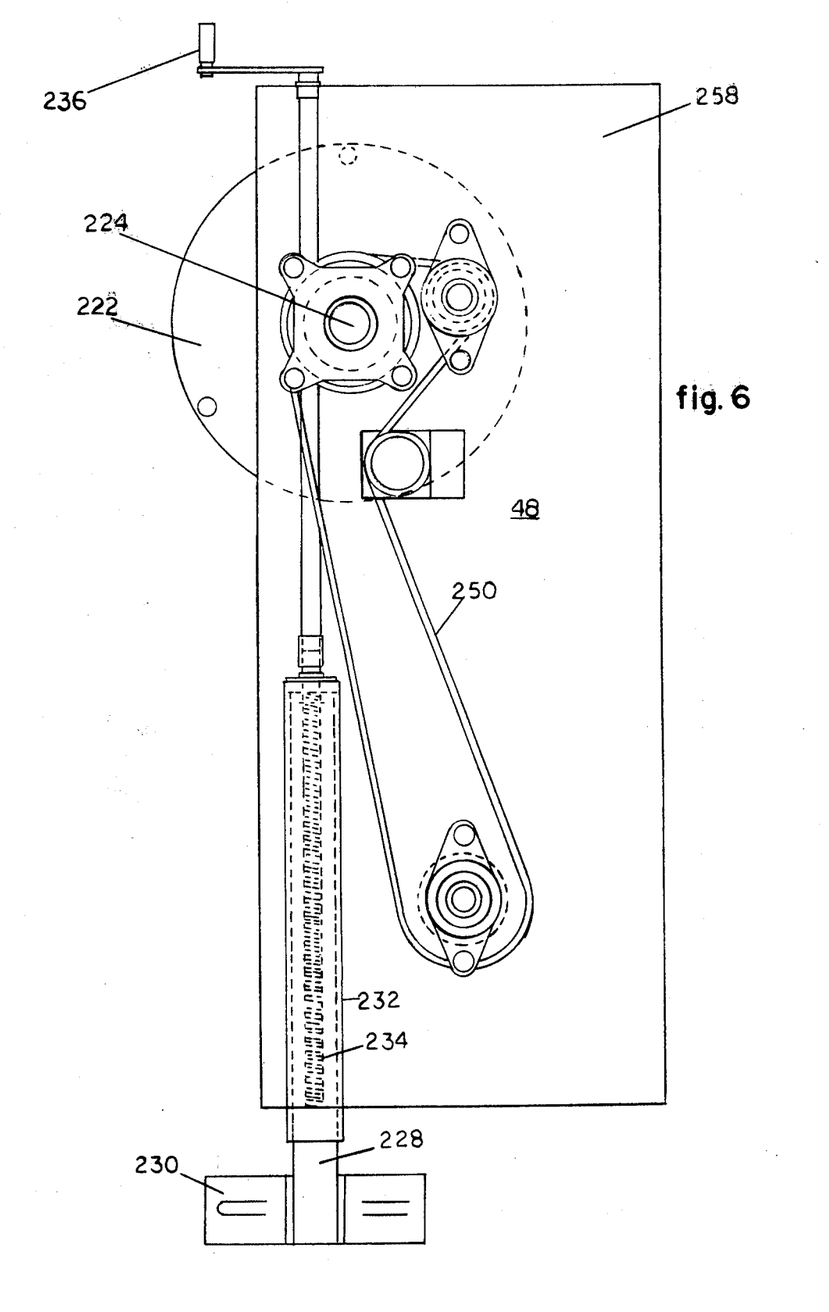
FIG. 6 is a front view of the cam drive assembly.

A sectional side view of the cam drive assembly and corresponding adjustable saddle cam 50 and adjustable mitre cam 52 are illustrated in FIG. 5. Secured within the cam drive assembly housing 220 is extendable leg 228. The purpose of the extendable leg 228 is for the raising and lowering of the cam drive assembly housing 220. Affixed to the end of the extendable leg 228 is mounting bracket 230. The mounting bracket 230 is affixed to the drive unit support stand 12. The extendable leg is housed within the threaded rod cylindrical housing 232. The relative positions of the extendable leg is also illustrated in FIG. 6.

A threaded rod 234 extends from the top of the cam drive assembly housing 220 and extends into the threaded rod cylindrical housing 232. The threaded rod further is secured within the extendable leg 228 which is internally threaded. Thus, the threaded rod may cause the extendable leg to be raised or lowered when the operator rotates the threaded rod handle 236. The raising and lowering of the extendable leg 228 in turn raises and lowers the cam drive assembly housing 220. With the raising and lowering of the cam drive assembly housing 220 the chuck face plate 222 and the chuck 226 are capable of raising and lowering and, thus, meeting the varied diameters of pipe which the chuck 226 must engage.

The cam drive assembly housing 220 is further assisted in raising and lowering by guides 238 which slide along vertical guide posts 240 and 242. Thus, the cam drive assembly housing 220 may slide vertically up or down over the vertical guide posts 240 and 242.

Positioning and housing the chuck face plate shaft 224 is saddle outer bearing 244 which is secured to the chuck face plate shaft 224 drives the cam drive sprocket 248. The saddle outer bearing 244 is conventionally affixed to the cam drive assembly housing side 246. Similarly, the cam drive sprocket 248 is conventionally affixed to the cam drive assembly housing side 246. The cam drive sprocket 248 powers cam drive chain 250. Cam drive chain 250 in turn powers saddle drive sprocket 252. Affixed within saddle drive sprocket 252 is saddle drive shaft 254. Saddle drive shaft 254 is also housed within saddle drive shaft bearing 256. The saddle drive shaft bearing 256 is conventionally affixed to the cam drive assembly housing side 258.

The saddle drive shaft 254 extends through cam drive assembly housing side 258 and is housed within saddle drive shaft bearing 256 which is conventionally affixed to the cam drive assembly housing side 258. The saddle drive shaft 254 extends through the saddle drive shaft bearing 256 and is secured to the adjustable saddle cam 50 thereby causing the desired rotation of the adjustable saddle cam 50.

After passing over the saddle drive sprocket 252 the cam drive chain 250 passes over the chain tightening sprocket 260. The chain tightening sprocket 260 is slidably affixed to the cam drive assembly housing side 258. Thus, the chain tightening sprocket 260 is capable of tightening the cam drive chain 250.

After having passed over the chain tightening sprocket 260 the cam drive chain 250 passes over and powers the mitre drive sprocket 262. The mitre drive sprocket 262 in turn powers the mitre drive shaft 264. Affixed to the cam drive assembly housing side 258 is mitre drive bearing 266 which houses the mitre drive shaft 264. Both the mitre drive bearing 266 and the mitre drive sprocket 262 are conventionally affixed to the cam drive assembly housing side 258. The mitre drive shaft 264, extends through the cam drive assembly housing side 258 whereupon it is housed within the mitre outer bearing 268. After passing through the mitre outer bearing 268, the mitre drive shaft 264 is affixed to the adjustable mitre cam 52.

The support stand 12, as illustrated in FIG. 1, provides the supporting basis for both the cam drive assembly housing 15 and the drive unit housing 14. The drive unit support stand has three legs, 270, 272, and 274.

Affixed to the rear drive unit support stand leg 274 are cable pulley support platforms 276 and 278. The cable pulley support platforms are parallel to one another and horizontal with the ground. Additionally, the cable pulley support platforms 276 and 278 form an "L" shape. At the end of the cable pulley support platform 276, and positioned vertical with the ground is cable pulley 280. Similarly, at the end of cable pulley support platform 278 and vertical with the ground is cable pulley 282. Secured to the lower face of cable pulley support platform 276 and horizontal with the ground is 90° rotation cable pulley 284. Similarly, fixed to the upper face of the cable pulley support platform 278 is 90° direction cable pulley 286. Thus, the 90° direction cable pulleys 284 and 286 allow the cable 54 to take a 90° change in direction from its direction as it comes in or goes out to the torch carriage versus the direction it takes from the cable assembly 16.

Extending from the top of the cam drive assembly housing is the frame 288. The frame 288 extends perpendicularly from the cam drive assembly housing side 258. The frame 288 is thus horizontal to the ground.

Affixed to the bottom of the cam drive assembly housing 220 is platform 290. The platform 290 is similarly horizontal with the ground and also is positioned directly below the frame 288.

Affixed vertically and at right angles to the frame 288 and platform 290 are cam slide posts 292 and 294. The cam slide posts 292 and 294 are parallel to one another and are affixed at either end of the platform 290 and the frame 288.

Thus, both the saddle slide 296 and the mitre slide 298 are capable of sliding vertically upon the cam slide posts 292 and 294. The saddle slide 296 is constructed of two slidable block ends 300 and 302. Slidable block end 300 has cam slide post 202 therethrough while slidable block end 302 with cam slide post 294 therethrough. Affixed between the slidable block ends 300 and 302 is saddle slide support bar 304. Thus, the slidable block ends 300 and 302 move concurrently with each other.

The mitre slide 298 similarly has slidable block ends 306 and 308 with cam slide posts 292 and 294 positioned through the slidable block ends 306 and 308 respectively. Affixed between the slidable block ends 306 and 308 of the mitre slide 298 are cross arms 310 and 312. The cross arms 310 and 312 leave a mitre slide slot 314 which allows the adjustable mitre cam follower 36 to slide therethrough.

The positioning of the pulleys and the cable 54 will now be described. All pulleys described herein are capable of free-wheeling about pulley axles.

Figure 7:
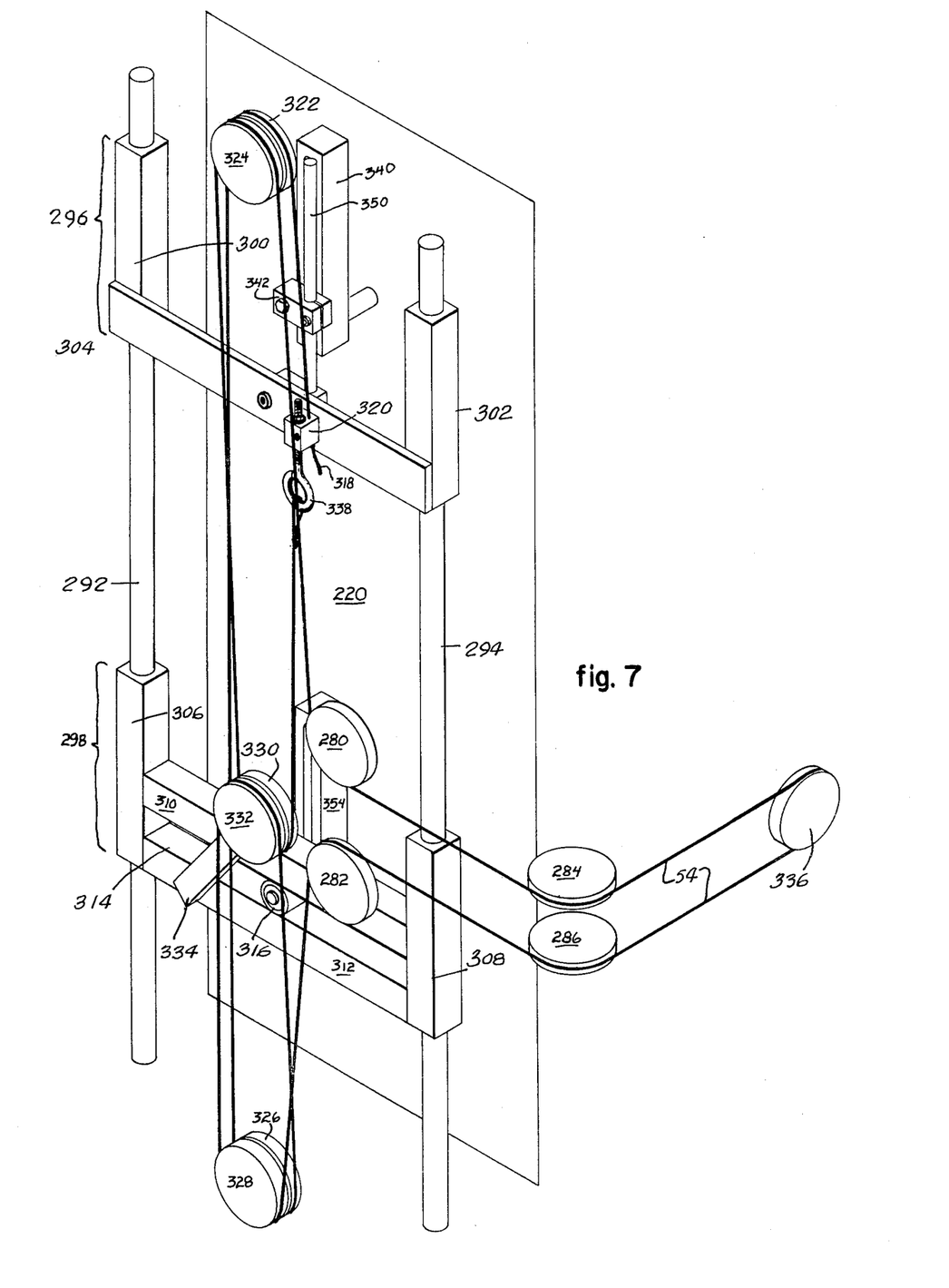
FIG. 7 is a perspective view of the cable assembly.

Cable end 318 of cable 54 is affixed to cable termination block 320. The cable termination block 320 is secured to the saddle slide support bar 304. Affixed to the frame 288 are cable pulleys 322 and 324. The cable pulleys are vertical and, thus, parallel to the sliding plane of the saddle slide 296. The cable pulleys 322 and 324 are set as a pair and as previously mentioned, the cable pulleys 322 and 324 are free-wheeling. Cable 54 first proceeds over and around cable pulley 322. Having passed over cable pulley 322, the cable 54 proceeds vertically down whereupon it proceeds around cable pulley 326. Cable pulley 326 and cable pulley 328 are affixed as a pair to platform 290. The cable pulleys 326 and 328 are both vertical and free-wheelingly secured to the platform 290. Having proceeded around the cable pulley 326 the cable 54 proceeds up and over cable pulley 332.

Cable pulleys 330 and 332 are set in a pair and are free-wheelingly secured to the cable pulley block support 334. The cable pulley block support 334 is secured to the mitre slide 298. After having passed over cable pulley 332 which is affixed to cable pulley block support 334, the cable passes over and around cable pulley 282 which is affixed to platform 278, whereupon the cable passes up and over cable pulley 282. Having passed over the cable pulley 282, the cable 54 proceeds around 90° angled direction cable pulley 286 whereupon it proceeds to the solenoid 162 of the torch carriage. In FIG. 4, the solenoid 162 has grippingly secured the cable 54 in a left salvage.

The cable proceeds to the end of the type support rack module 20, whereupon it proceeds around end pulley 336. Having proceeded around end pulley 336, the cable 54 has made a 180° directional change and, thus, heads back to the torch carriage 56 whereupon it is grippingly secured by solenoid 160 if it is a right salvage. Having left solenoid 160, the cable 54 proceeds around 90° directional cable pulley 284 and under cable pulley 280. Having proceeded under cable pulley 280, the cable 54 proceeds over the cable pulley 324 affixed to the frame. Having extended over the cable pulley 324 affixed to the frame 288, the cable proceeds down and around cable pulley 330 which is affixed to the cable pulley block support 334. Having proceeded around cable pulley 330 of the cable pulley block support, the cable 54 heads vertically upward whereupon it is fastened to eye bolt 338 which is in turn secured to cable termination block 320.

The adjustable saddle cam 50 will now be discussed in detail. Affixed to the saddle drive shaft 254 is the adjustable saddle cam 50. The positioning of the saddle cams are best illustrated in FIG. 6 and FIG. 7. In FIG. 7 a perspective view of the saddle cam is illustrated.

Secured to the saddle drive shaft is the saddle cam arm 340. Likewise, affixed to the saddle cam arm 340 is the adjustable saddle cam block 342. The adjustable saddle cam block 342 is conventionally affixed to the saddle cam arm face 344 through a slot 346 in the saddle cam arm. Thus, the saddle cam block 342 may be positioned at any position throughout the length of the slot 346.

The adjustable saddle cam block 342 has a hole 348 in which the saddle cam connecting rod 350 is positioned therethrough. Thus, as the adjustable saddle cam block 342 is secured at different positions in the slot 346 the adjustable saddle cam block slides over and secured at different positions to the saddle cam connecting rod 350. The end of the saddle cam connecting rod 350 is secured to the pivot anchor 352. The pivot anchor is in turn secured to the saddle slide support bar 304.

Let us use a specific example to better understand the working of the adjustable saddle cam 50. In order for the saddle cam 50 to work, the distance between the center of the saddle slide support bar 304 to the center of the adjustable saddle cam block 342 must be equal to the radius of the outer diameter of the trunk line. In our example, the radius of the trunk line is six inches. Thus, when a distance between the center of the saddle slide support bar 304 and adjustable saddle cam block 342 is achieved, the saddle cam connecting rod securing bolt 342 is tightened, thus securing the saddle cam connecting rod 350 to the adjustable saddle cam block 342. Once this is secured, the adjustable saddle cam block is then put into the cam setting as read off the graph in FIG. 9. Thus, as the saddle cam arm rotates the saddle cam connecting rod forces the saddle slide to move vertically up and down. This in turn effects cable The workings of the adjustable mitre cam 52 will now be discussed in detail.

The adjustable mitre cam arm 354 is secured to the mitre drive shaft 264. The adjustable mitre cam arm 354 is in turn secured to the adjustable mitre cam follower 316. The adjustable mitre cam follower 316 is positioned within the mitre slide slot 314 which is formed by cross arms 310 and 312. As can be seen, if the adjustable mitre cam follower is secured towards the end of the adjustable mitre cam arm 354 as the adjustable mitre cam arm 354 rotates, the adjustable mitre cam follower will have a greater up and down vertical component. Thus, the greater the distance out from the center of the adjustable mitre cam arm 354 that the adjustable mitre cam follower 316 is positioned the greater the vertical up and down component the mitre slide 298 will experience.

The revolutions per minute of the adjustable mitre cam arm are one to one with the revolutions of the pipe being cut. However, the revolutions of the adjustable saddle cam arm 340 are two to one of the pipe being cut. Thus, the revolutions of the saddle cam arm are twice the revolutions of the adjustable mitre cam arm.

The present invention also allows the operator to cut a combination saddle and mitre. This is achieved by merely setting the desired setting on the saddle cam arm 340 and the adjustable mitre cam arm 354. In order to better understand this, i.e., let us go to and explain the graphs shown in FIGS. 8 and 9.

Figure 8:
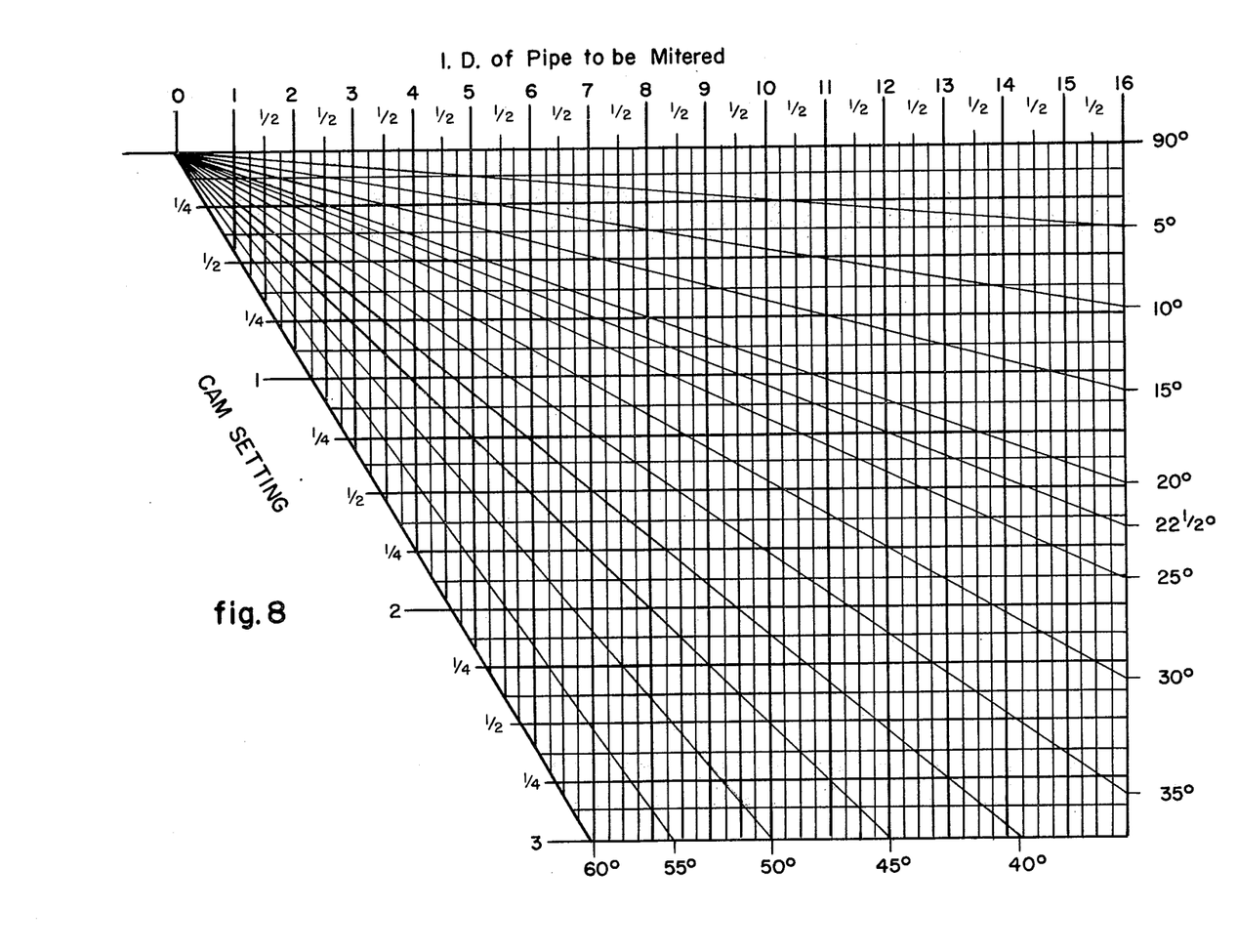
FIG. 8 is a graph for the mitre cam setting.
Figure 9:
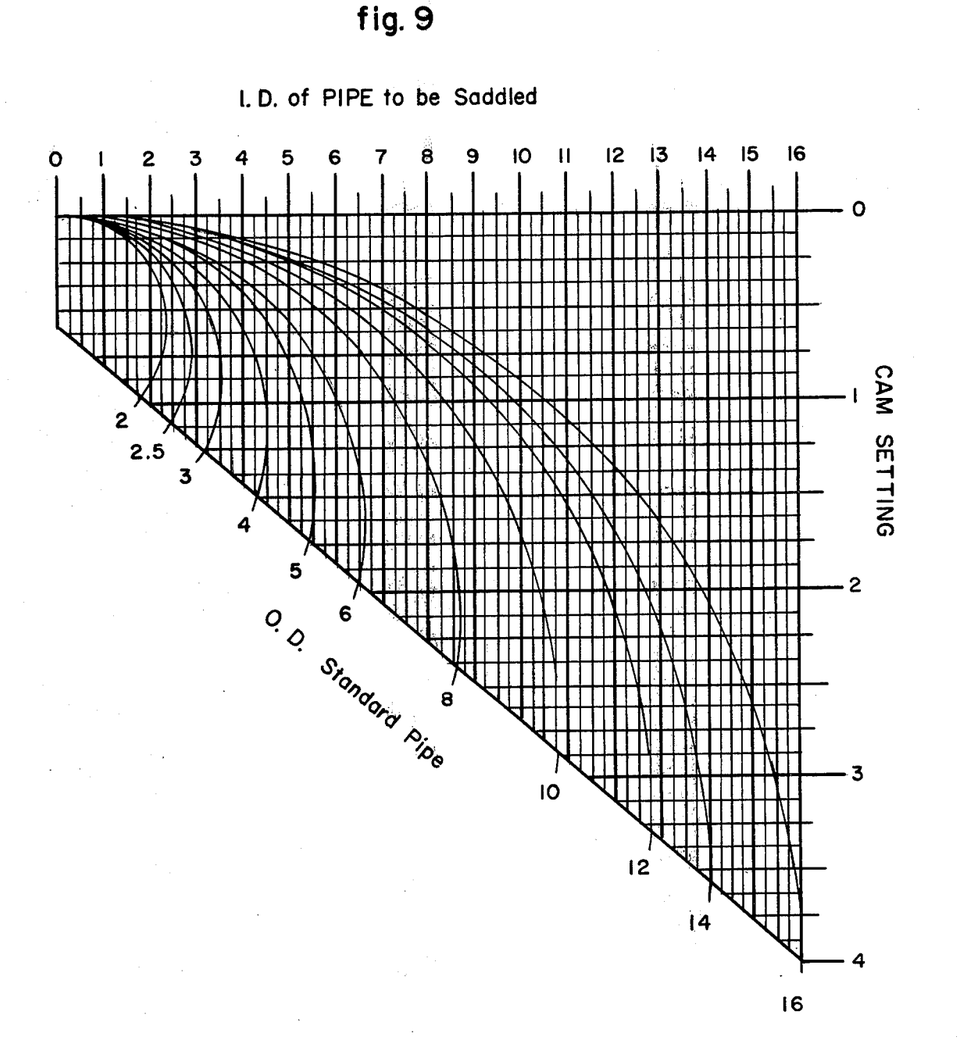
FIG. 9 is a graph for the saddle arm setting.

Determination of the positioning of the cam setting by the operator is simplified by the graph tables set forth in FIGS. 8 and 9 which determines the cam settings. Let us first begin with the setting on the adjustable mitre cam 52. The graph for the settings is set forth in FIG. 8. First, the operator determines the internal diameter of the pipe to be mitred.

Let us consider that the internal diameter of the pipe is 8". Thus, the operator goes along the top table of the graph and finds the position labeled 8. Let us consider also that the operator wishes to make a 30° cut. Thus, the operator goes down the right hand side of the table which sets forth the angles and finds the designation 30. The operator then follows the 30 line up until it intersects with the 8 line. At the point of intersection, the operator makes a horizontal line to the left determining the cam setting. As set forth in the mitre graph table in FIG. 8 the setting would be between 1⅛" and 1¼" or approximately 13/16" on the cam mitre setting.

Let us work another example with the mitre setting graph. Let us assume that the internal diameter of the pipe is 11" and the operator wishes to make a 40° cut. Thus, the operator finds the 40° position on the bottom of the graph and follows the 40° line until it intersects with the 11" inner diameter of line 11. The operator then takes this point of intersection horizontally overto the cam setting line and finds that the cam setting position is between 2¼" and 2⅜" and, thus, the operator sets the cam mitre setting at 25/16".

Let us now consider the remaining graph in FIG. 9 for determination of setting. The graph in FIG. 9 assists in the determination of the saddle cam settings. The upper line of the graph sets forth the inner diameter pipe to be saddled. On the lower sloping edge of the graph is the outer diameter of the pipe which is to be saddled onto. Let us take the example of a 4" branch pipe to be saddled to a 5" trunk pipe. Let us consider the angle of intersection to be at 45°. The operator finds the 5" pipe and follows the curve until it intersects with the 4" pipe and it is determined that the intersection when run over to the cam setting line is 7/16".

To determine the actual cam setting the following formula is set forth:

Cam setting=(reading off graph FIG. 9) (Secant of angle cutting at)

Thus, the cam setting to be set forth on the instrument is actually in this example equal to 7/16×1.4142.

The readings off graph FIG. 9 is actually equal to the inside dimension of drop in the pipe.

To set forth another example let us have an 8" branch pipe saddled onto a 10" trunk pipe. Follow the 10" curve until it intersects with the 8" pipe which is the position of 7/8.

Thus, let us further consider for example that the angle to be cutting at is 45°. The secant of 45° equals 1.4142. Thus, the cam setting is equal to 7/8×1.4142 which equals 1.23.

Let us take further the example set forth above, an 8" branch pipe saddled into a 10" trunk pipe at a 45° angle.

Our first step is setting the saddle cam connecting rod at 5⅛" which is the radius of a 10" pipe. The ⅛" takes into account the outside diameter of a 10" pipe. Once this position is reached, the saddle cam connecting rod bolt 356 secures the saddle cam connecting rod 350 to the saddle cam block 342. The next step is for the operator to set the adjustable saddle cam block 342 at a setting of 1.23 on the saddle cam arm 340. When reaching the 1.23 point the adjustable saddle cam block 342 is secured to the saddle cam arm 350 by saddle cam arm pivot bolt 358.

Since the pipes are coming in at a 45° angle, this is accounted for by the setting on the adjustable mitre cam arm 354. To accomplish this setting, we go to the graph at FIG. 8. The 45° position is followed until it intersects the 8" internal diameter line. From this point a reading of 2 is determined. Thus, the operator secures the adjustable mitre cam follower 316 at a position 2 on the adjustable mitre cam arm 354.

These steps having been accomplished, the interaction of the two slides which determine the movement of the cable 54 will thereby move the torch carriage assembly in the desired movement in order to accomplish the desired cut.

The graphs as set forth in FIGS. 8 and 9 are particularly designed and take into account the settings of pulleys in relation to the slides in the preferred embodiment. Thus, a different setting of relationships of pulleys would necessarily change the graphs. The main concept, however, is the interaction of the mitre cam slide and the saddle slide on one given cable which moves the torch carriage in a desired movement for a given cut.

As set forth in FIG. 10, solenoid valves 360, 362 and 364 are secured to the back of the control panel face plate 182. The solenoid valves 360, 362 and 364 control the flow of gas and oxygen to the torch.

Although a particular preferred embodiment of the invention has been disclosed above for illustrative purposes, it is to be understood that variations or modifications thereof which lie within the scope of the appended claims are contemplated.

I claim:

1. A pipe cutting machine comprising:
   a frame;
   a torch which is affixed to the frame;
   a means for rotating a pipe which is secured to the frame;
   a means for translating the rotation of the pipe to a first cam;
   a means for translating the rotation of the pipe to a second cam;
   a means for translating the rotation of the first cam such that the rotation of the first cam is capable of translating the rotation of the first cam to the torch such that the torch is capable of cutting a saddle cut on the pipe; and
   a means for translating the rotation of the first cam and second cam such that the translation of the first cam and second cam to the torch such that the torch is capable of cutting a combination of saddle and mitre cuts on the pipe.

2. The pipe cutting machine of claim 1 wherein the means for translating the rotation of the first cam to the torch comprises:
   a torch carriage which is secured to the frame;
   a cam whose movement is dictated by the means for translating the rotation of the pipe;
   a slide;
   a means for translating the vertical component of motion from the cam to a slide;
   a means for translating the vertical component of motion from the slide to a cable;
   a means for translating the vertical component of motion of the cable to a corresponding horizontal component of motion in the torch carriage; and
   a means for translating the horizontal component of motion in the torch carriage to the torch.

3. The pipe cutting machine of claim 2 wherein the means for translating the rotation of the second cam to the torch comprises:
   a torch carriage which is secured to the frame;
   a second cam whose movement is dictated by the means for translating the rotation of the pipe;
   a second slide;
   a means for translating the vertical component of motion of the second cam to the second slide;
   a means for translating the vertical component of motion from the slide to a cable;
   a means for translating the vertical component of motion of the cable to a corresponding horizontal component of motion in the torch carriage; and
   a means for translating the horizontal component of motion in the torch carriage to the torch.

4. The pipe cutting machine of claim 3 wherein the means for translating the rotation of the first cam and second cam to the torch comprises:
   an adjustable cam;
   a means for translating the vertical component of motion from the cam to the slide;
   a pair of pulleys parallel to the slide;
   a second adjustable cam;
   a means for translating the vertical component of motion of the second cam to the second slide;
   a second pair of pulleys parallel and attached to the second slide;
   a third pair of pulleys parallel to the second pair of pulleys below the second pair of pulleys;
   a cable affixed at both ends to the first slide;
   a means for affixing the cable to the pulleys such that the vertical component of motion of the two slides is translated to a corresponding motion of the cable;

a means for translating the motion of the cable to a corresponding horizontal component of motion in the torch carriage; and a means for translating the horizontal component of motion in the torch carriage to the torch.

5. The pipe cutting machine of claim 4 wherein the means for rotating the pipe comprises:
- a motor;
- two drive wheels affixed to the frame upon which the pipe may rest; and
- a means for the motor to rotate the drive wheels.

6. The pipe cutting machine of claim 5 wherein the means for translating the rotation of pipe to the first cam comprises:
- a chuck capable of securing a pipe;
- a shaft secured to the chuck; and
- a means of rotating the first cam from the rotation of the shaft wherein the cam rotates twice to every one rotation of the shaft.

7. The pipe cutting machine of claim 6 wherein the means for translating the rotation of pipe to the second cam comprises:
- the chuck capable of securing the pipe;
- the shaft secured to the chuck; and
- a means for rotating the second cam from the rotation of the shaft wherein the cam rotates once to every rotation of the shaft.

8. The pipe cutting machine of claim 7 wherein the first cam comprises:
- a cam arm secured to the means of driving the cam;
- a cam lock capable of being secured to the cam arm and further capable of receiving a slidable rod;
- a slidable rod positioned through the cam lock;
- a block affixed to the first slide;
- a means of affixing the slidable rod permanently to the block affixed to the slide; and
- a means of setting the slidable rod in relation to the cam lock at various distances from the block.

9. The pipe cutting machine of claim 8 wherein the second cam comprises:
- a cam arm;
- a cam follower;
- a means of affixing the cam follower at various distances along the cam arm; and
- a means of securing the cam follower to the second slide, wherein the vertical component of motion of the cam follower will be directly translated to a vertical component of motion in the second slide.

10. A pipe cutting machine comprising:
- a support stand;
- a pipe support rack module affixed to the support stand wherein the pipe support rack module may be easily engaged or disengaged from the support stand;
- a series of pipe support rack modules capable of being engaged or disengaged to the first pipe support rack module;
- two parallel tracks secured to the support stand;
- a pair of roller wheels capable of supporting a resting pipe and further capable of sliding on the two parallel tracks;
- a second set of tracks secured to the pipe support rack modules wherein a torch carriage may slide along the tracks;
- a torch;
- a swinging torch arm affixed to the torch carriage which secures the torch;
- a chuck which is affixed to the support stand;
- a chuck shaft secured to the chuck;
- a first cam;
- a second cam;
- a means of rotating the first cam from the rotation of the shaft wherein the cam rotates twice to every one rotation of the shaft;
- a means of rotating the second cam from the rotation of the shaft wherein the cam rotates once to every one rotation of the shaft;
- a cam arm secured to the means of driving the cam;
- a cam lock capable of being secured to the cam arm and further capable of receiving a slidable rod;
- a slidable rod positioned through the cam lock;
- a first slide which is vertically slidably affixed to the support stand;
- a block affixed to the first slide,
- a means of affixing the slidable rod permanently to the block affixed to the first slide; and
- a means of setting the slidable rod to the cam lock at various distances from the block;
- a pair of pulleys parallel to the first slide;
- a second adjustable cam;
- a cam arm;
- a cam follower;
- a means of affixing the cam follower at various distances along the cam arm;
- a second slide which is vertically slidably affixed to the support stand;
- a means of securing the cam follower to the second slide, wherein the vertical component of motion of the cam follower will be directly translated to a vertical component of motion in the second slide;
- a second pair of pulleys parallel and attached to the second slide;
- a third pair of pulleys parallel to the second pair of pulleys below the second pair of pulleys;
- a cable affixed at both ends of the first slide;
- a means for affixing the cable to the pulleys such that the vertical component of motion of the two slides is translated to corresponding motion of the cable;
- a pulley at the end of the last secured pipe support rack module such that the cable makes a 180° turn;
- a solenoid secured to the torch carriage capable of gripping the upper component of the cable passing the torch carriage so that the movement of the cable moves the torch carriage in a direct relation;
- a second solenoid capable of securing the lower component of the cable passing the torch carriage so that the movement of the cable moves the torch carriage in a direct relation;
- a motor secured to the support stand;
- two drive wheels upon which the pipe may rest; and
- a means for the motor to rotate the drive wheels.

* * * * *